Feb. 2, 1960   R. JORN ET AL   2,923,570
ELASTIC WHEEL

Filed July 30, 1956   2 Sheets-Sheet 1

$V \cdot \cos\alpha \gtreqless f \sin\alpha$
or $\dfrac{V}{f} > tg\,\alpha$

INVENTOR.
RAOUL JÖRN and
WALTER BECK
BY Richards & Geier
ATTORNEYS

Feb. 2, 1960 R. JORN ET AL 2,923,570
ELASTIC WHEEL
Filed July 30, 1956 2 Sheets-Sheet 2

INVENTOR.
RAOUL JÖRN and
WALTER BECK
BY
Richards Geier
ATTORNEYS

United States Patent Office 2,923,570
Patented Feb. 2, 1960

2,923,570

ELASTIC WHEEL

Raoul Jorn and Walter Beck, Hamburg-Harburg, Germany

Application July 30, 1956, Serial No. 600,880

2 Claims. (Cl. 295—11)

This invention relates to an elastic wheel, and refers more particularly to wheels for use in conjunction with motor driven vehicles.

Elastic wheels have been used in prior art for vehicles movable upon rails and also for street cars driven upon tires. A purpose of such wheels is to prevent the transmission of noises into the vehicle. Furthermore, in the case of vehicles provided with tires the elastic wheels provide a better adherence to the ground and thus make it possible to operate the vehicle more securely upon curves, the resiliency of the vehicle as a whole being furthered by the additional resiliency of the wheels.

The wheels known in prior art require complicated tools and vulcanization molds for the manufacture of the parts thereof, and the rims as well as the discs of such wheels have a form which strongly deviates from the normal construction of a wheel. This makes the use of wheels, the resiliency of which is attained by the use of rubber, quite difficult.

An object of the present invention is to improve elastic wheels of this type.

Another object is to improve and facilitate the manufacture of elastic elements of such wheels.

Other objects of the present invention will become apparent in the course of the following specification.

The objects of the present invention may be realized through the provision of an elastic wheel having elastic elements which may be made of rubber or a similar material having corresponding elastic properties. The rubber may be firmly connected with metal parts located upon the ends thereof, or the preliminary tension required for the assembly can be attained by friction. The elastic layers are inclined in cross-section relatively to the central plane of the wheel disc. In accordance with the present invention, the resiliency of the wheel disc is attained by two separately manufactured combination rubber-metal structural elements which are located symmetrically to the central plane of the wheel disc or in a plane which is parallel thereto, said elements being mounted into a wheel hub of the usual type. The assembly is particularly simplified for wheels having wheel rims which are provided with wedge-shaped supporting surfaces upon the inner side. In that case the mounting of the rubber-metal elements upon the wheel rim is carried out in accordance with the present invention, by producing a preliminary pressure tension in the axial direction in the rubber bodies during the axial pressure and the firm connection of the inner metal parts, whereby the inner metal parts press against the wheel rim.

When the wheel rim is constructed in the usual massive manner, the outer metal portions of the rubber-metal element may support each other, according to the invention.

A further important feature of this invention consists also in that the axial preliminary tension of the rubber body must have such a high value that in the case of a radial load upon the wheel, no traction forces are developed in the rubber. In the case of radial load, additional shearing-pressure forces are developed in the rubber due to the shifting of the wheel rim in the lower zones, while in diametrically opposed zones, i.e. in the upper side of the wheel, the preliminary traction-pressure tension is diminished. If there were no preliminary tension at all or if the preliminary tension is too small, traction forces will be produced in the rubber, which in the case of dynamic continuous exertion, would soon result in breakage. On the other hand, the preliminary pressure tension must not be too great, since then in the case of continuous use, tensions in the lower zones or in the lower side of the wheel may result in premature breakage.

The present invention is also particularly suitable for wheels of motor driven vehicles having a comparatively thin walled wheel rim. There the invention provides that the annular rubber-metal elements which are operatively connected with the rim through preliminary axial tension, are provided with thin rubber lining upon those metal portions which are directed toward the rim, said lining serving as a support or cushion for the circumference of the rim. An advantage of this construction is that the cushions adapt themselves well to the rim and the higher friction between rubber and steel maintains an operative connection even during the worst possible working conditions, such as may be found in trucks, for example. Furthermore, the rim is effectively protected, since even the smallest dents are eliminated, which is particularly important for rims carrying rubber-filled tires which require an airtight seat. In order to provide that despite deviations in the size of the rim, which are unavoidable even when normal range of tolerances is maintained, the angular rim ring which is imbedded in the rubber, should always lie smoothly against the rim, the thin rubber lining of the angular rim ring, particularly the axially extending outline thereof, is provided with rib-like projections, which due to their compressibility can balance the small deviations in the measurements. These ribs can extend radially as well as in the circumferential direction.

The present invention also provides that the outer metal parts which are firmly connected with the angularly mounted resilient rubber parts, are constructed angularly in cross-section. Due to this arrangement, the metal parts are rendered sufficiently resistant against bending, even when they are quite thin, so that they are in condition to receive substantial axially operating forces produced due to the preliminary tension of the rubber bodies, and also due to the existence of side forces when the vehicle travels upon a curve, as well as the radical forces. At the same time the angular form of the cross-section of the metal parts facilitates the mounting in the vulcanization form. A further advantage of this construction is that the rubber fibres in the edge zones extend in a better manner, which is of paramount importance for the durability of the structure. Finally, the members of this construction which in cross-section are of angular form and extend axially, present excellent bearing and protecting surfaces for the angular rubber member which are particularly effective in the case of excessive load and hard blows.

In accordance with a further important embodiment of the inventive idea, the rubber body does not have the same cross-sectional area throughout the entire circumference thereof, but is constricted in various places to form a body of small thickness. The advantage of this construction is that in case of the same cross-sectional area, the required rubber ring suitable for normal wheel loads and the desired path of spring deviation, would have a comparatively large height of the rubber in the radial direction. Such a rubber ring would have the drawback that it cannot absorb high pressure forces in the radial direction, since it buckles and therefore cannot receive the required preliminary pressure tension. Thus it will not receive the stiffness required in the axial direction so as to maintain the wheel on the track. On the other hand, when the rubber ring is manufactured in accordance with the present invention, the cross-section of the rubber at those locations which are not restricted, has a width which makes it easily subject to preliminary tension without buckling, whereby the tractional forces arising from shearing are also avoided to a large extent. The cross-section in those locations has advantageously the form of a parallelogram, so that the resultant of the shearing and pressure forces will extend through the central line of the cross-sectional area of the rubber. On the other hand, in the constricted locations the cross-section of the rubber body is so narrow that it can hardly receive any load during shearing, so that these locations have, from a practical standpoint, no influence upon the resiliency properties of the elastic wheel. The continuous closed ring which is constricted in places has, however, substantial advantages in comparison to the use of individual rubber pieces as far as the manufacture and formation of the vulcanization mold are concerned. Furthermore, such a ring prevents the penetration of dirt between the ring and the spanner when the wheel is on location and being operated. If particular circumstances, such as the use of large break drums which are located close to the rubber rings, require a good cooling, then the rubber ring can be provided at the constricted sections with bore holes extending through its entire cross section, without changing the resiliency or the strength. Furthermore, in accordance with the present invetnion, in the last-mentioned case the bore holes can be provided in the metal parts which enclose the hollow space.

In the case of excessive loads, particularly when used on bad roads or the like, the rubber portions can be brought into contact with metal portions so often that frictional heat is developed and the outer surface of the rubber is rubbed off. In order to prevent an early detioration of the elasticity of the construction by such occurrences, the present invention provides that the rubber surfaces directed toward the hollow space be coated with a suitable lubricant.

The invention will appear more clearly from the following detailed description when taken in connection with the accompanying drawings, showing, by way of example, preferred embodiments of the inventive idea.

Figure 1:
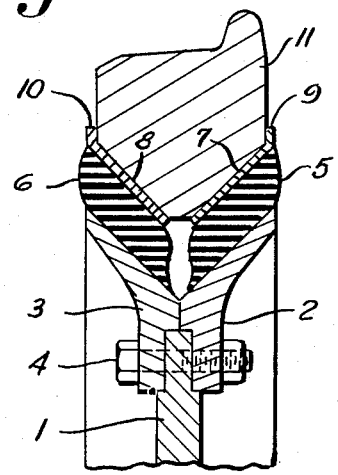
Figure 1 shows in section a portion of an elastic wheel constructed in accordance with the principles of the present invention.

Figure 1 shows a hoop wheel having a wheel disc 1. The disc 1 carries two inner metal rings 2 and 3, which are firmly connected with the disc 1 by screws 4. Rubber bodies 5 and 6 are firmly connected with the inner metal rings 2 and 3 by vulcanization, or in some other manner. The rubber bodies 5 and 6 carry outer metal rings 7 and 8 which are provided with flanges 9 and 10, respectively. The rubber-metal element 2, 5, 7, 9 and the rubber-metal element 3, 6, 8, 10 are symmetrically constructed and can be tooled separately. When the inner metal rings 2 and 3 are firmly joined to the disc 1 by screws 4, the rubber bodies 5 and 6 will be subjected to a preliminary tension which is so great that the wheel rim 11 will be held firmly and without play between the metal rings 7 and 8 and their flanges 9 and 10, whereby no tractional tensions will be developed in the rubber bodies 5 and 6 when the wheel is subjected to a load.

Figure 2:
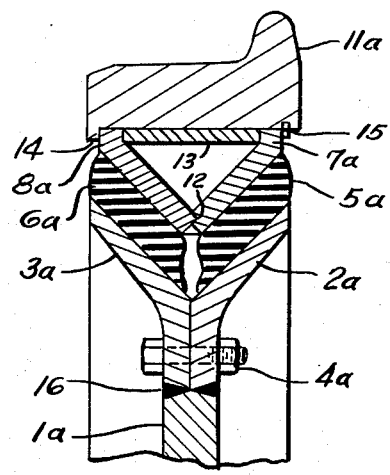
Figure 2 is a section through a wheel of a somewhat different form.

The elastic wheel shown in Figure 2 also includes two rubber-metal elements which consist of inner metal rings 2a and 3a, closed metal rings 7a and 8a, as well as rubber bodies 5a and 6a. The outer metal rings 7a and 8a engage and support each other at 12 and are held by a distancing sleeve 13 in the desired position. The inner rings 2a and 3a are pressed together at 4a by a screw, or the like, and thus the rubber bodies 5a and 6a will be subjected to a substantial preliminary tension, which again is so great that when the wheel rim 11a is subjected to a load, tractional forces will not occur in the rubber. The wheel rim 11a is of the usual construction and is connected with rings 7a and 8a. The ring 8a engages a flange 14, while the metal ring 7a is held firmly by the usual retaining ring 15. In this construction the elements are connected with the wheel disc 1a by seam welding 16.

Figure 3:
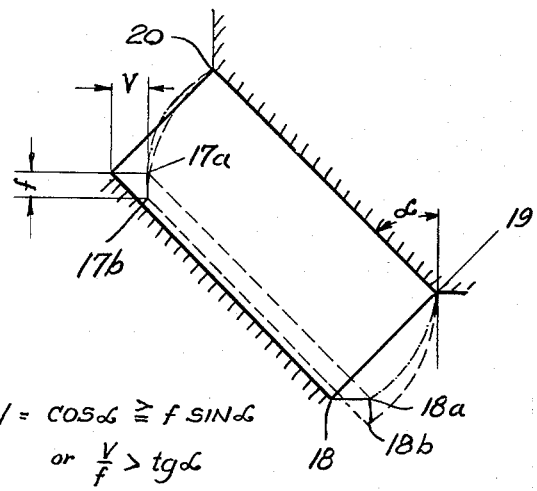
Figure 3 is a diagram illustrating the rubber body in the upper wheel zone in positions of rest, preliminary tension and load.

Figure 3 shows a parallelogram 17, 18, 19 and 20 which represents diagrammatically a cross-section through one of the rubber bodies upon the upper side of the wheel. It will be noted that it is inclined in relation to the vertical plane to the extent of the angle $\alpha$ in non-tensioned state of no load. Due to the preliminary axial tension by the amount $v$ the cross-section assumes the form 17a, 18a, 19, 20. When the wheel is loaded radially to the extent represented by $f$ the cross-section is changed again to 17b, 18b, 19, 20. In order to provide conditions which are such that in the position represented by 17b, 18b, 19, 20 there should still be a preliminary pressure tension in the rubber, it is necessary that the ratio of the axial preliminary tension of the rubber body to the radial path of movement of the elastic wheel be greater than the tangent of the angle of inclination of the elastic element to the central plane. This may be represented by the formula $$v \cdot \cos \alpha \geq f \cdot \sin \alpha$$

$$\frac{v}{f} > \tan \alpha$$

Figure 4:
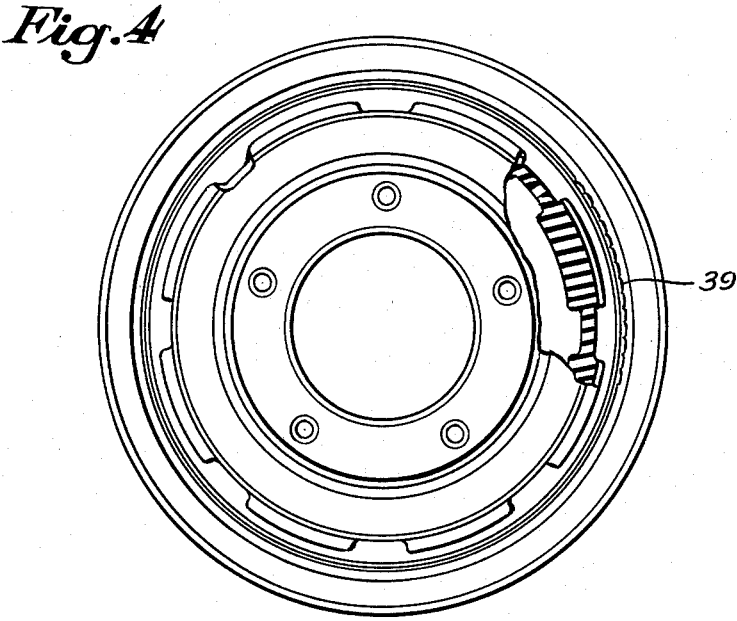
Figure 4 is a side view of a somewhat differently constructed elastic wheel.
Figure 5:
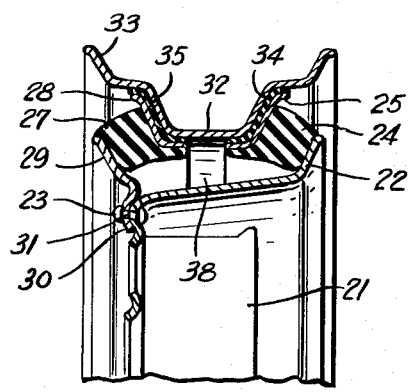
Figure 5 is a section through a portion of the wheel shown in Figure 4 on an enlarged scale.

Figures 4 and 5 show a wheel carrying a brake drum 21. A metal ring 22 is connected to the brake drum 21 at 23 by means of bolts or rivets. A rubber body 24 is firmly attached to the metal ring 22 upon its one side. The other side of the rubber body 24 is firmly connected with a metal ring 25.

Figure 6:
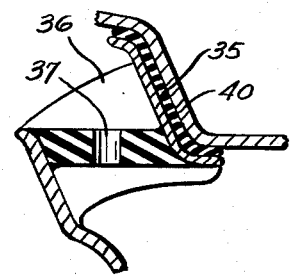
Figure 6 is a sectional view of a portion of the wheel of Figures 4 and 5 on a still larger scale.

A second rubber body 27, the cross-section of which is the same as that of the rubber body 24, is firmly connected by vulcanization with a metal ring 28, the form and the dimensions of which correspond to the metal ring 25. A metal ring 29 which is different in size and form to the metal ring 22, is firmly connected to the opposite side of the rubber body 27. The metal ring 29 is provided with a flange 30 which is firmly connected with a metal ring 22 at 31 by rivets, welding or bolts. It will be apparent that the metal rings are angular in cross-section. The elastic rubber bodies 24 and 27 extend to each other in the form of a V and by joining them an axial tension is developed therein, so that obviously they will grip the base 32 of the metal rim 33. It should be noted, however, that the metal rings 25 and 28 do not engage the wheel rim directly, since this engagement takes place by means of rubber linings or cushions 34 and 35. The rubber cushion 35 is best shown in Figure 6. The rubber cushions or linings 34 and 35 are used to balance any deviations in construction and transmit the pressure forces of the spring-like rings 24 and 25 to the wheel rim 33. The rubber linings or cushions 34 and 35 can extend around the entire circumference of the wheel and can be provided with ribs or corrugations 39 or 40, which may extend radially or in the direction of the circumference of the wheel. The rubber bodies may be provided with recessed portions 36 and holes 37. The recesses 36 have the purpose to adapt the resilient properties to the desired requirements, while the bore holes 37 are used to provide air into the inner space 38 located between the members 22 and 30. As shown in Figure 4, the rubber rings are provided with constrictions located at uniform intervals so that they have a small width, and the restricted portions of the rubber are provided with bore holes.

Furthermore, bore holes may be provided in the metal members enclosing the inner hollow space.

To improve the life of the wheel the rubber surfaces which are directed toward the hollow space can be coated with a layer of a suitable lubricant.

It is apparent that the examples shown above have been given by way of illustration and not by way of limitation, and that they are subject to many variations and modifications within the scope of the present invention. All such variations and modifications are to be included within the scope of the present invention.

What is claimed is:

1. An elastic wheel comprising a wheel disc, two opposed separate inner metal rings having inclined surfaces converging relatively to each other and to said disc, means interconnecting said metal rings with tension and connecting them to said disc, two spaced separate opposed conically-shaped rubber bodies extending in V-form relatively to each other, each of said rubber bodies being firmly connected with a separate inner metal ring, inclined opposed outer metal rings, each of said outer metal rings being firmly connected with a separate rubber body and being located opposite an inner metal ring, said means maintaining a preliminary pressure tension in said rubber bodies, and a wheel rim enclosing said outer metal rings, said rubber bodies being spaced relatively to the central plane of the wheel to facilitate the radial resiliency of the wheel.

2. An elastic wheel in accordance with claim 1, comprising rubber linings interposed between said outer metal rings and said wheel rim.

References Cited in the file of this patent

UNITED STATES PATENTS

| | | |
|---|---|---|
| 1,247,988 | Mortier | Nov. 27, 1917 |
| 2,113,379 | Maas | Apr. 5, 1938 |
| 2,618,393 | Withall | Nov. 18, 1952 |
| 2,800,357 | Boschi | July 23, 1957 |

FOREIGN PATENTS

| | | |
|---|---|---|
| 723,975 | Great Britain | Feb. 16, 1955 |